(12) United States Patent
Faigle

(10) Patent No.: US 6,168,199 B1
(45) Date of Patent: Jan. 2, 2001

(54) INFLATOR FOR AN INFLATABLE VEHICLE OCCUPANT PROTECTION DEVICE

(75) Inventor: Ernst M. Faigle, Dryden, MI (US)

(73) Assignee: TRW Vehicle Safety Systems Inc., Lyndhurst, OH (US)

( * ) Notice: Under 35 U.S.C. 154(b), the term of this patent shall be extended for 0 days.

(21) Appl. No.: 08/923,277

(22) Filed: Sep. 4, 1997

(51) Int. Cl.⁷ .................................................. B60R 21/26
(52) U.S. Cl. ............................................. 280/736; 280/742
(58) Field of Search ................................... 280/737, 735, 280/736, 739, 738, 742, 740, 741

(56) References Cited

U.S. PATENT DOCUMENTS

| | | | |
|---|---|---|---|
| 4,021,058 | * 5/1977 | Suzuki et al. | 280/737 |
| 4,817,828 | 4/1989 | Goetz . | |
| 4,886,293 | 12/1989 | Weiler et al. . | |
| 4,938,501 | * 7/1990 | Wipasuramonton | 280/743.1 |
| 5,106,119 | * 4/1992 | Swann et al. | 280/736 |
| 5,199,740 | 4/1993 | Frantom et al. . | |
| 5,263,740 | 11/1993 | Frey et al. . | |
| 5,269,561 | * 12/1993 | Davis et al. | 280/736 |
| 5,439,250 | * 8/1995 | Kokeguchi et al. | 280/736 |
| 5,468,015 | 11/1995 | Goetz . | |
| 5,547,638 | * 8/1996 | Rink et al. | 280/736 |
| 5,615,912 | * 4/1997 | O'Loughlin et al. | 280/737 |
| 5,788,274 | * 8/1998 | Gunn | 280/736 |

OTHER PUBLICATIONS

U.S. Patent Appln. Serial No. —, filed Aug. 5, 1997, entitled "Vehicle Occupant Protection Apparatus", Attorney Docket No. TRW(AP)3557.

* cited by examiner

*Primary Examiner*—Paul N. Dickson
*Assistant Examiner*—Lynda Jasmin
(74) *Attorney, Agent, or Firm*—Tarolli, Sundheim, Covell, Tummino & Szabo L.L.P.

(57) ABSTRACT

An inflator (10) includes a tank (12), an outlet manifold (14), and an initiator (40). The tank (12) stores inflation fluid (18) under pressure. The initiator (40), when actuated, initiates a flow of the inflation fluid (18) from the tank (12) to the exterior of the inflator (10) along an outlet flow path extending through the manifold (14). The inflator (10) further includes a pressure controlling structure (80) which partially obstructs the outlet flow path through the manifold (14). The pressure controlling structure (80) is rupturable under the influence of a predetermined inflation fluid pressure force.

5 Claims, 1 Drawing Sheet

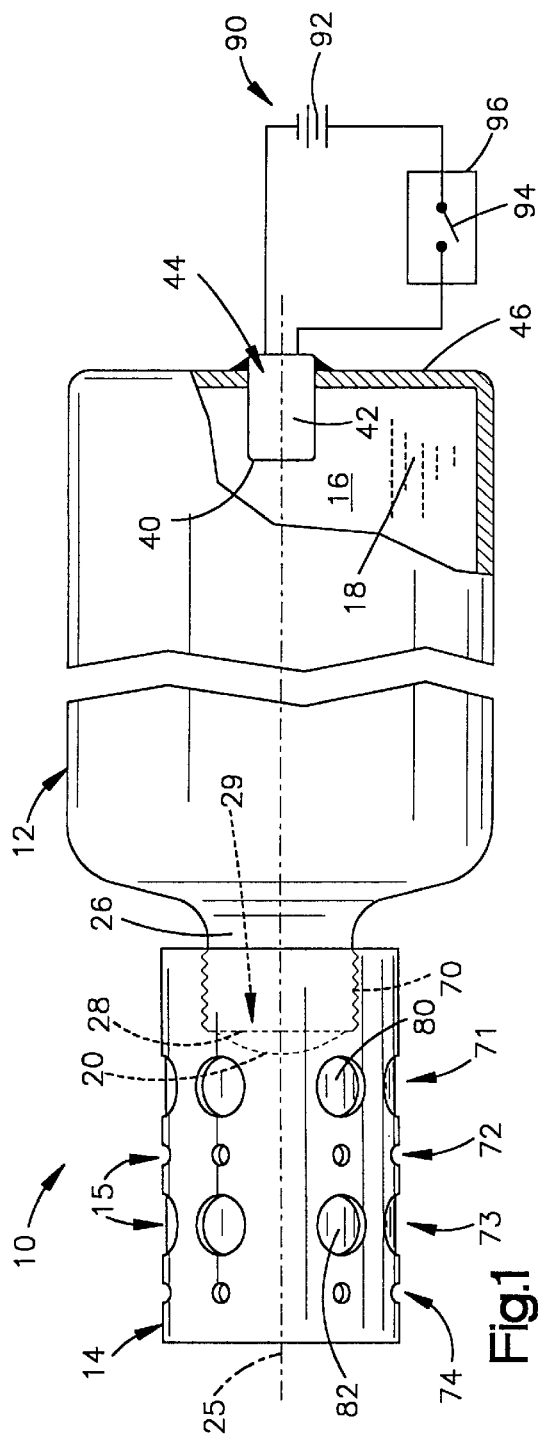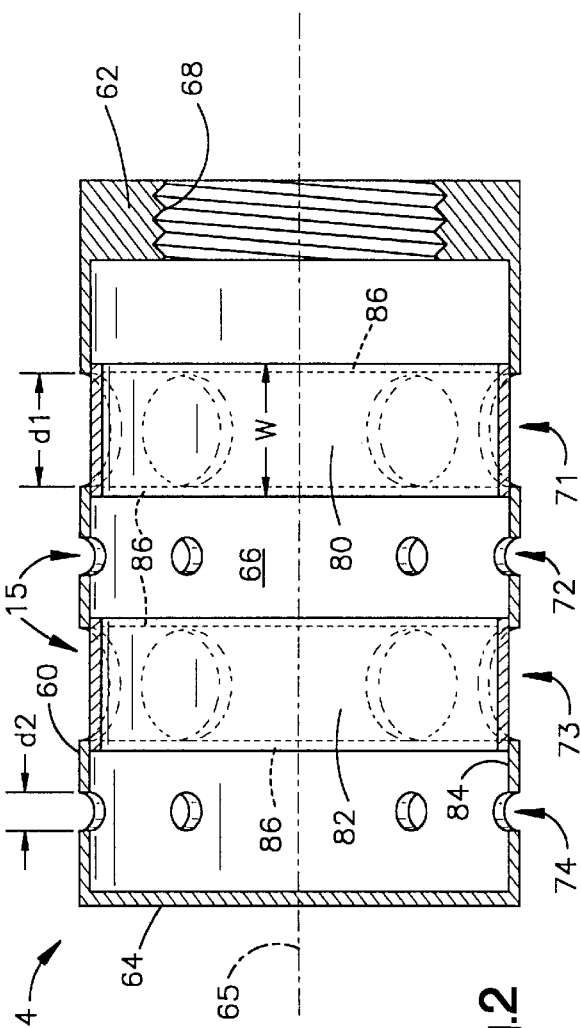

INFLATOR FOR AN INFLATABLE VEHICLE OCCUPANT PROTECTION DEVICE

FIELD OF THE INVENTION

The present invention relates to an inflator, and particularly relates to an inflator for an inflatable vehicle occupant protection device such as an air bag.

BACKGROUND OF THE INVENTION

An inflatable vehicle occupant protection device, such as an air bag, is deployed upon the occurrence of a vehicle crash. The air bag is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment. When the air bag is deployed in this manner, it engages an occupant of the vehicle to help protect the occupant from a forceful impact with parts of the vehicle as a result of the crash. The manner in which the inflating air bag engages the occupant can be influenced by the pressure of the inflation fluid in the air bag.

SUMMARY OF THE INVENTION

In accordance with the present invention, an inflator comprises a tank, an outlet manifold, and an initiator. The tank stores inflation fluid under pressure. The initiator, when actuated, initiates a flow of the inflation fluid from the tank to the exterior of the inflator along an outlet flow path extending through the manifold. The inflator further comprises a pressure controlling structure which partially obstructs the outlet flow path through the manifold. The pressure controlling structure is rupturable under the influence of a predetermined inflation fluid pressure force.

An inflator constructed in accordance with the present invention is especially effective for inflating a vehicle occupant protection device. The inflator initially provides a "soft" stage of inflation in which the fluid pressure in the inflatable device increases relatively slowly. The soft stage of inflation is maintained while the outlet flow path through the manifold is partially obstructed by the pressure controlling structure. However, by partially obstructing the outlet flow path, the pressure controlling structure causes the fluid pressure in the manifold to increase to the predetermined elevated level. The pressure controlling structure is then ruptured, and the outlet flow path is no longer obstructed. As a result, the soft stage of inflation is followed by a subsequent stage in which the fluid pressure in the inflatable device is increased more rapidly by the inflation fluid emerging from the manifold along the unobstructed flow path.

BRIEF DESCRIPTION OF THE DRAWINGS

Further features of the present invention will become apparent to those skilled in the art from reading the following description with reference to the accompanying drawings, in which:

FIG. 1 is a partly schematic view of apparatus including an electrical circuit and an inflator comprising a preferred embodiment of the present invention; and FIG. 2 is a sectional view of a part of the inflator shown in FIG. 1.

DESCRIPTION OF A PREFERRED EMBODIMENT

An inflator 10 comprising a preferred embodiment of the present invention is shown in FIG. 1. The inflator 10 includes a tank 12, which is sometimes referred to as a bottle, and an outlet manifold 14. The manifold 14 has a plurality of inflation fluid outlet openings 15. The tank 12 has a storage chamber 16 which contains inflation fluid 18 under pressure, and has a rupturable closure wall 20 which closes the storage chamber 16. The closure wall 20 is ruptured when the inflator 10 is actuated. The inflation fluid 18 then flows from the storage chamber 16 along an outlet flow path extending through the manifold 14 from the tank 12 to the outlet openings 15, and further from the outlet openings 15 to the exterior of the inflator 10.

As an example of a tank that can be used in accordance with the present invention, the tank 12 has an elongated, cylindrical configuration with a longitudinal central axis 25. A reduced-diameter neck portion 26 of the tank 12 has an annular end surface 28 defining a circular outlet opening 29. The closure wall 20, which may comprise a burst disk with a known structure, is welded to the end surface 28 of the tank 12 to close the outlet opening 29.

The inflation fluid 18 may have any composition and storage pressure suitable for inflating a vehicle occupant protection device (not shown). For example, the inflation fluid 18 may consist of helium at a storage pressure within the range of about 4,000 psi to about 7,000 psi. However, the inflation fluid 18 preferably comprises combustible fluid, and most preferably comprises a combustible mixture of gases including a fuel gas, an oxidizer gas, and an inert gas in accordance with the invention set forth in U.S. Pat. No. 5,348,344, assigned to TRW Vehicle Safety Systems Inc. The combustible mixture of gases 18 preferably has a storage pressure within the range of about 1500 psi to about 5000 psi.

An initiator 40 functions to initiate the outlet flow of inflation fluid described above. The initiator 40 comprises a particular type of electrically actuatable device which is known as a squib. Accordingly, the initiator 40 has a cylindrical casing 42 containing a small charge of pyrotechnic material. The casing 42 extends closely through and closely fits within an aperture 44 in an end wall 46 of the tank 12, and projects from the end wall 46 into the storage chamber 16.

As shown separately in FIG. 2, the manifold 14 in the preferred embodiment of the invention is a cylindrical structure with an elongated cylindrical side wall 60, a circular base 62, and a circular end wall 64, each of which is centered on a longitudinal axis 65. These parts 62–64 of the manifold 14 together define a cylindrical manifold chamber 66. The base 62 of the manifold 14 has an internal screw thread 68 which engages an external screw thread 70 (FIG. 1) on the neck 26 of the tank 12. The outlet openings 15 are located in the side wall 60 of the manifold 14. The end wall 64 of the manifold 14 defines a closed end of the chamber 66.

As further shown in FIG. 2, the outlet openings 15 are arranged in first, second, third and fourth rows 71, 72, 73 and 74. The four rows 71–74 of outlet openings 15 extend circumferentially around the side wall 60 of the manifold 14, and are spaced apart along the length of the side wall 60. The outlet openings 15 in the first and third rows 71 and 73 all have a first diameter d1. The outlet openings 15 in the second and fourth rows 72 and 74 all have a second, lesser diameter d2.

A pair of pressure controlling structures 80 and 82 partially obstruct the inflation fluid flow path extending outward through the manifold 14. The pressure controlling structures 80 and 82 in the preferred embodiment of the invention are strips of metal foil with widths W that are greater than the first diameter d1. The foil strips 80 and 82 extend circumferentially around an inner surface 84 of the side wall 60 at locations centered on the first and third rows 71 and 73 of outlet openings 15, respectively, and are spaced axially from the second and fourth rows 72 and 74 of outlet openings 15. Adhesive bonds 86 fasten the foil strips 80 and 82 to the inner surface 84. In this arrangement, the foil strips 80 and 82 block the outlet openings 15 in the first and third rows 71 and 73, but do not block the outlet openings 15 in the second and fourth rows 72 and 74.

As shown schematically in FIG. 1, the initiator 40 is connected in an electrical circuit 90 in a vehicle. The electrical circuit 90 includes a power source 92, which is preferably a vehicle battery and/or a capacitor, and a normally open switch 94. The switch 94 is part of a sensor 96 which senses a vehicle condition indicating the occurrence of a crash. The crash-indicating condition may comprise, for example, sudden vehicle deceleration that is caused by a crash. If the crash-indicating condition is at or above a predetermined threshold level, it indicates the occurrence of a crash having at least a predetermined threshold level of severity. The threshold level of crash severity is a level at which inflation of the air bag or other inflatable device is desired to help protect an occupant of the vehicle.

When the sensor 96 senses a crash-indicating condition at or above the predetermined threshold level, the switch 94 closes and the initiator 40 is actuated electrically. The pyrotechnic material in the casing 42 is ignited, and produces combustion products including heat and hot particles. These combustion products are spewed from the casing 42 into the storage chamber 16 to ignite the fuel gas in the storage chamber 16. The heat generated by combustion of the fuel gas increases the fluid pressure in the storage chamber 16.

When the increasing fluid pressure in the storage chamber 16 reaches a predetermined elevated level, it ruptures the closure wall 20. The mixture of gases 18 is thus released to flow outward from the tank 12 through the manifold 14. However, the outlet flow path extending through the manifold 14 is partially obstructed by the foil strips 80 and 82, as described above. The foil strips 80 and 82 constrain the inflation fluid initially to flow outward from the manifold 14 only through the second and fourth rows 72 and 74 of outlet openings 15. The relatively small flow area provided by those outlet openings 15 causes the inflation fluid initially to emerge from the manifold 14 at relatively low flow rates. This provides a "soft" initial stage of inflation in which the fluid pressure in the inflatable device increases at correspondingly low rates. The inflation fluid 18 flowing from the tank 12 into the manifold chamber 66 simultaneously applies increasing fluid pressure forces radially outward against the foil strips 80 and 82. When these increasing fluid pressure forces reach a predetermined elevated level, they rupture the foil strips 80 and 82 at the locations of the outlet openings 15 in the first and third rows 71 and 73. Accordingly, the outlet flow path is no longer obstructed by the foil strips 80 and 82. The inflation fluid then flows outward through the greater flow area provided by all four rows 71–74 of outlet openings 15, and thus emerges from the manifold 14 at subsequent flow rates that are greater than the initial flow rates. This provides a subsequent stage of inflation in which the fluid pressure in the inflatable device increases at correspondingly greater rates.

From the above description of the invention, those skilled in the art will perceive improvements, changes and modifications. Such improvements, changes and within the skill of the art are intended to be covered by the appended claims.

Having described the invention, the following is claimed:

1. An inflator comprising:

a tank storing inflation fluid under pressure and having a circular outlet opening having an external screw thread;

an outlet manifold having an internal screw thread engageable with said external screw thread;

an initiator which, when actuated, initiates a flow of said inflation fluid from said tank to the exterior of said inflator along an outlet flow path extending through said manifold; and a pressure controlling structure partially obstructing said outlet flow path through said manifold, said pressure controlling structure being rupturable under a predetermined inflation fluid pressure force, said outflow path extends through a plurality of outlet openings in said manifold, said pressure controlling structure prior to actuation of said initiator blocking a first group of said outlet openings and not blocking a second group of openings.

2. Apparatus as defined in claim 1 wherein said pressure controlling structure comprises a strip of metal foil extending fully across said first group of outlet openings.

3. Apparatus as defined in claim 1 wherein said outlet openings in said first group are larger than said outlet openings in said second group.

4. An inflator comprising:

a tank storing inflation fluid under pressure;

an outlet manifold;

an initiator which, when actuated, initiates a flow of said inflation fluid from said tank to the exterior of said inflator along an outlet flow path extending through said manifold; and a pressure controlling structure partially obstructing said outlet flow path through said manifold, said pressure controlling structure being rupturable under a predetermined inflation fluid pressure force, said outlet flow path extends through a plurality of outlet openings in said manifold, said pressure controlling structure prior to actuation of said initiator, blocking a first group of said outlet openings and not blocking a second group of said outlet openings.

5. An inflator according to claim 4 wherein said first group of outlet openings and said second group of said outlet openings are axially and alternately spaced from each other along the longitudinal length of a part of said inflator.

* * * * *